(12) United States Patent  (10) Patent No.: US 8,403,402 B1
Portela  (45) Date of Patent: Mar. 26, 2013

(54) MAGNETIC BAND

(76) Inventor: Mario Placido Portela, Miami, FL (US)

(*) Notice: Subject to any disclaimer, the term of this patent is extended or adjusted under 35 U.S.C. 154(b) by 0 days.

(21) Appl. No.: 13/247,434

(22) Filed: Sep. 28, 2011

Related U.S. Application Data

(60) Provisional application No. 61/393,935, filed on Oct. 17, 2010.

(51) Int. Cl.
*B60N 99/00* (2006.01)
(52) U.S. Cl. ................... 296/187.03; 293/126
(58) Field of Classification Search .............. 293/126, 293/127, 128; 701/45; 296/187.03
See application file for complete search history.

(56) References Cited

U.S. PATENT DOCUMENTS

| | | | |
|---|---|---|---|
| 3,802,727 A | | 4/1974 | Beckley |
| 5,799,992 A | * | 9/1998 | Kojima .................. 293/128 |
| 6,085,151 A | | 7/2000 | Farmer et al. |
| 6,268,803 B1 | | 7/2001 | Gunderson et al. |
| 6,834,899 B2 | | 12/2004 | Lindsey |
| 2004/0142603 A1 | | 7/2004 | Walker |
| 2006/0186702 A1 | | 8/2006 | Kisanuki et al. |
| 2007/0040363 A1 | * | 2/2007 | Breed et al. .............. 280/730.2 |
| 2007/0176462 A1 | * | 8/2007 | Lombardo ................. 296/136.1 |
| 2007/0278804 A1 | * | 12/2007 | Shields .................. 293/128 |
| 2009/0026776 A1 | * | 1/2009 | Simmons ................. 293/128 |
| 2009/0132129 A1 | * | 5/2009 | Breed ...................... 701/45 |
| 2010/0310794 A1 | * | 12/2010 | Nordvik et al. ........... 428/31 |

* cited by examiner

*Primary Examiner* — Lori Lyjak
(74) *Attorney, Agent, or Firm* — KB Patents; Luca D'Ottone

(57) ABSTRACT

The device of the present invention is an magnetic band to be applied to vehicles such as car, boats, race cars, passengers or cargo cars of railroad trains as well as in trucks and all other kind of land vehicles. The magnetic band is such to cause repulsion between cars as they approach one to the other one.

20 Claims, 6 Drawing Sheets

MAGNETIC BAND

CLAIM OF PRIORITY

The present application claims priority from U.S. Provisional Patent Application No. 61/393,935 to Mario Placido Portela filed on Oct. 17, 2010 directed to an Electromagnetic band and Photoelectric cell Safety Device.

BACKGROUND OF THE INVENTION

1. Field of the Invention

The invention pertains to a system which greatly reduces or prevents altogether the injuries and property damage and consequent suffering, deaths and expense incident to motor vehicle collisions. The invention accomplishes this result by providing the motor vehicle with novel means which cooperate to absorb the energy of impacts in such a way as to minimize the harmful effects of collisions on the vehicle and its occupants and to minimize damage or injury to other vehicles, property, etc., struck by or in collisions with the vehicle constructed and equipped according to the invention. These results are achieved by using an electromagnetic device that wraps around the outside perimeter of vehicles and has the effect to create an electromagnetic field which repels away the vehicles from each other. Also, it is very important to make clear that the magnetic band has to be activated by the driver in a possible crash situation in the same fashion he would activate the claxon. This applies to regular cars and trucks as well as for boats and railroad trains with the exception of race cars which would have it activated during the race and only deactivated for maintenance.

2. Brief Description of the Prior Art

Magnetism is a non-contact force generally known in the art. Magnetism relates to material's behavior that responds at an atomic or subatomic level to an applied magnetic field. For example ferromagnetism is that phenomenon such that some ferromagnetic materials produce their own persistent magnetic field either attracting or repelling each other. Aristotle and Thales first wrote about magnetism in the western world about 500 B.C. In modern times Serbian engineer Nikolas Tesla first explored the relationship between electricity and magnetism and its commercial applications.

In addition to that various prior art patents deal with magnetism's related inventions. For example U.S. Pat. No. 3,802,727 to Beckley discloses and claims a motor vehicle damage and injury preventing system is disclosed. The Beckley system is based upon shock-absorbing bumpers extending over substantially the entire flattened front and rear ends of a specially designed vehicle and made up of a relatively thin sheet of compressible, rigid but bendable, shock-absorbing, impact-resistant material on the outer face of which is a relatively thick mass of cellular shock-absorbing plastic material. Under the teachings of Beckley patent, typically a second relatively thin sheet of the impact-resistant material is provided on the outer portion of the cellular shock-absorbing plastic material and a second relatively thick mass of the cellular shock-absorbing plastic material is provided on the outer portion of this second sheet.

U.S. Patent Application No. 20060186702 to Kisanuki, Inoue, Furukawa, Miki, Ono, Ninomiya and Sunami discloses a collision behavior control apparatus which comprises a contacting portion disposed in a portion of the front of a vehicle, and which, at the time of collision against a pedestrian or a two-wheeler with a rider riding thereon, controls the behavior of the pedestrian or the two-wheeler rider by pushing the pedestrian or the two-wheeler rider separated from the two-wheeler with the contacting portion, wherein the pedestrian or the two-wheeler rider is pushed by the contacting portion such that the pedestrian or the two-wheeler rider is not bumped up onto the hood, whereby the pedestrian or the two-wheeler rider is moved to the vehicle side.

U.S. Pat. No. 6,085,151 to Farmer and Bruce discloses and claims a relatively narrow beam of either RF or optical electromagnetic radiation is scanned over a relatively wide azimuthal range. The return signal is processed to detect the range and velocity of each point of reflection. Individual targets are identified by clustering analysis and are tracked in a Cartesian coordinate system using a Kalman filter. Under the teaching of Farmer and Bruce patent, the threat to the vehicle for a given target is assessed from estimates of the relative distance, velocity, and size of each target, and one or more vehicular devices are controlled responsive to the assessment of threat so as to enhance the safety of the vehicle occupant. In a preferred embodiment, a quantized linear frequency modulated continuous wave RF signal is transmitted from and received by a multi-beam antenna having an aziumthal range of at least +/−100 degrees and an individual beam width of approximately 10 degrees.

U.S. Pat. No. 6,268,803 to Gunderson, Parisi, Gorman, and Melin discloses and claims a collision avoidance system including a control module, a first transmitting device connected to the control module, wherein the first transmitting device transmits a signal, a first receiving device connected to the control module, wherein the first receiving device receives a return of the signal transmitted from the first transmitting device and transmits a first return signal representative of the return to the control device, a second transmitting device connected to the control module, wherein the second transmitting device transmits a signal, and a second receiving device connected to the control module device, wherein the second receiving device receives a return of the signal transmitted from the second transmitting device and transmits a second return signal representative of the return to the control device, wherein the control module includes measurement circuitry used to measure the first and second return signals and display means for displaying a transverse location of an object as a function of said first and second return signals.

U.S. Patent Application No. 20040142603 to Walker discloses an apparatus having layers. A first layer has a conductive adhesive region and a non-conductive adhesive region. Under the teachings of the Walker patent, a second layer has an electronic component in electrical connection to the conductive adhesive regions in the first layer so that the conductive adhesive regions provide contact points for the electronic component. A third layer has an adhesive material to couple the apparatus to an object. A forth layer substantially covers the third layer.

U.S. Pat. No. 6,834,899 to Lindsey discloses and claims a bumper assembly having a movable bumper is disclosed. A crash sensor is attached to the movable bumper. A linkage is provided to attach the movable bumper to a motor vehicle. Under the teachings of Lindsey patent, when the movable bumper is attached to the motor vehicle, the linkage permits the movable bumper to be moved from a first position to a second position that is horizontally displaced from the first position in a direction away from the motor vehicle. Extending the bumper in this manner allows the crash sensor to provide early detection of a collision involving the motor vehicle.

Despite all the efforts listed above prior art patents describe structures that are either not truly convenient or else involve complicated, expensive, and overly difficult assembly parts and procedures. Other devices have been advertised on various media but never patented or described into a printed publication.

SUMMARY OF THE INVENTION

The device of the instant invention is an electromagnetic band that would wrap around different kind of vehicles such as automobiles, carriages, cars, boats, and trains. The object of the device of the present invention is to envelope the outside perimeter of said vehicle to create an electromagnetic field that repels away from other automobiles using the same technology. Due to the principles of magnetism, magnets either attract or repel a certain object depending upon the similarity of the poles-like poles repel. It is well known that different poles attract each other same poles repel each other. Considering that the purpose of this device is to repel away from other vehicles or walls/barriers, then opposing magnets must have compatible poles; thus, creating a repelling force between the objects.

It is a secondary objective of the present invention to provide for a practical device that is safe to use and display.

It is an additional objective of the present invention to provide a device that does not rust, or deteriorates in difficult conditions of a car bumper. It is a final objective of the present invention to provide for a device that is cheap to build, but that can eventually be sold at a premium.

Being all type of boat sizes and the up and down motion of the sea, it is necessary special geometric designs having vertical and horizontal bands because bands of both ships must face each other at the approaching moment. Also the lower part of the bands has to be in all boats at a certain distance of the floating line These and other objective achieved by the device of the present invention will be apparent by the drawings, by their detailed description, and by the specification here from appended.

DESCRIPTION OF THE PREFERRED EMBODIMENT

Figure 1:
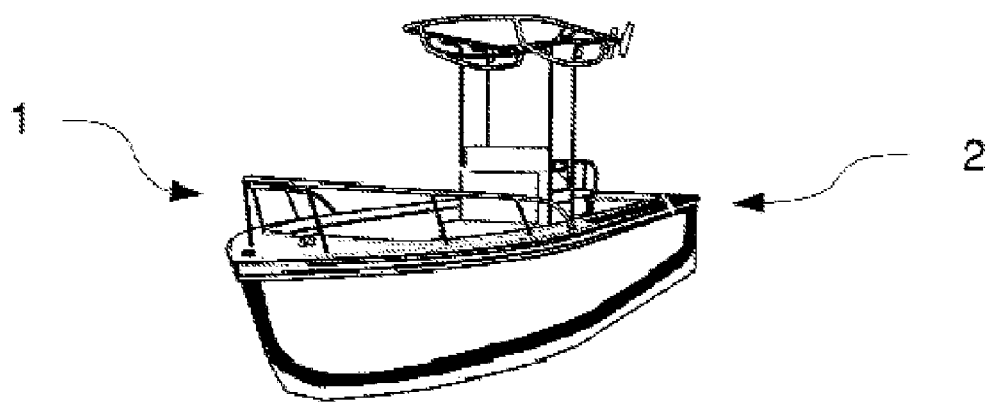
FIG. 1 is a perspective view of one of the preferred embodiments of the Electromagnetic band (1) of the present invention installed on a boat (2) in accordance with the teachings of the present application.
Figure 2:
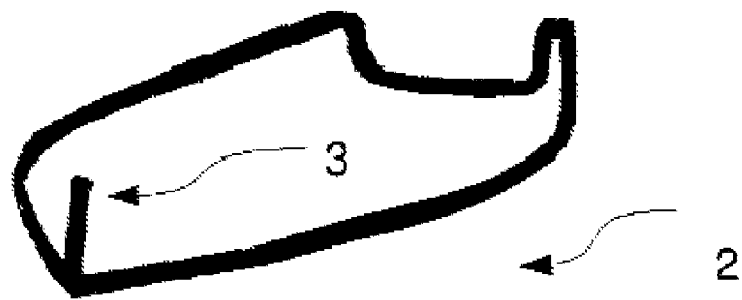
FIG. 2 is a perspective view of the Electromagnetic band (1) of FIG. 1 alone, without the boat.
Figure 3:
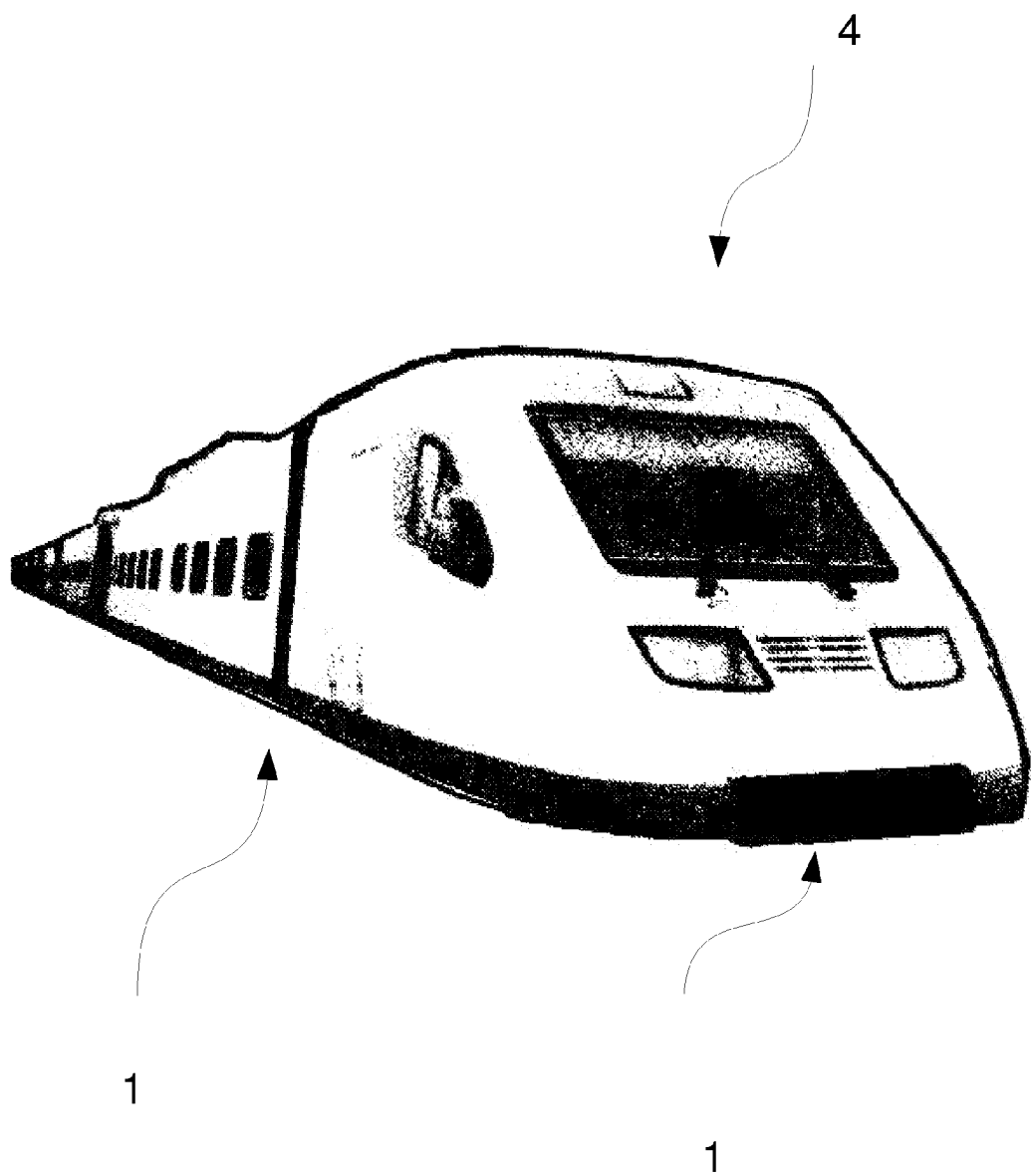
FIG. 3 is a perspective view of one of the preferred embodiments of the Electromagnetic band of the present application installed on front of a train (4) and in between the wagons.
Figure 4:
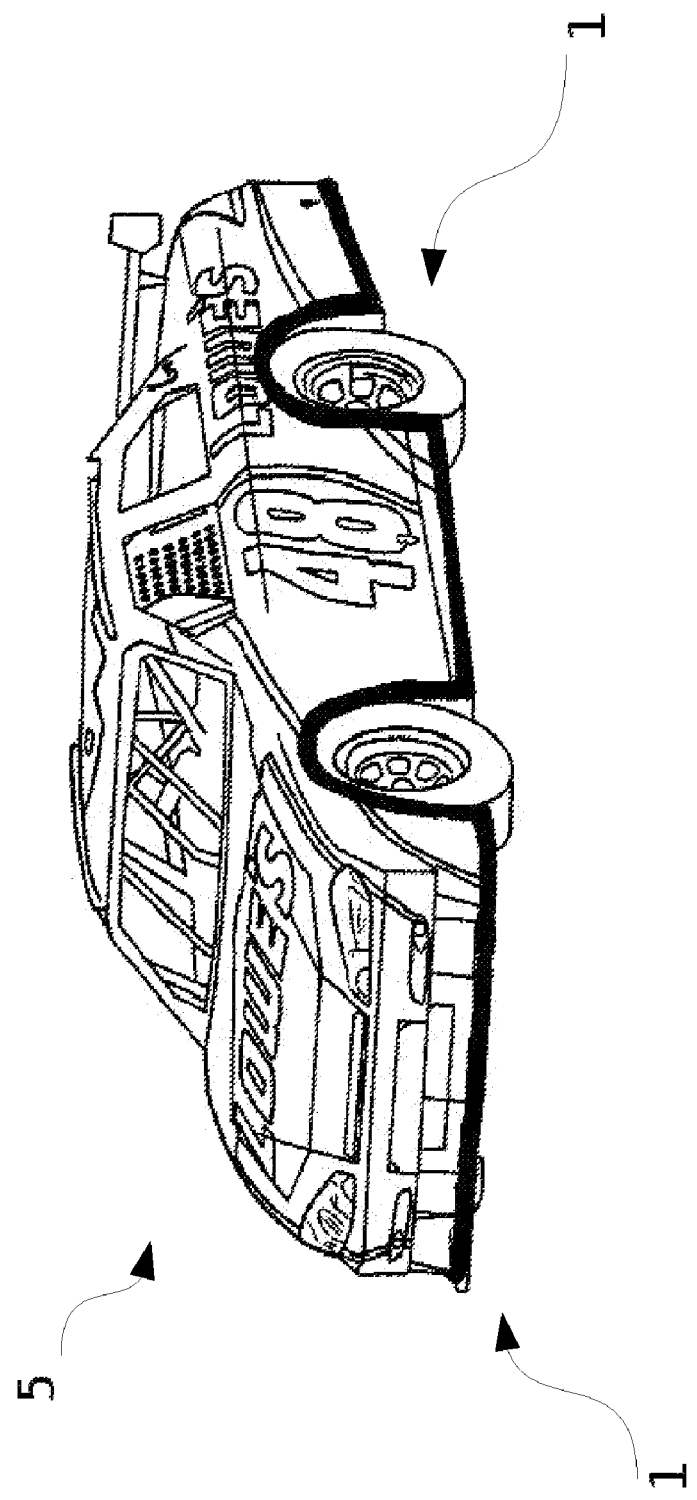
FIG. 4 is a side lateral view of one of the preferred embodiments of the Electromagnetic band of the present application (1) installed on a car (5).

As it can be seen from the drawings the device of the present invention consists in an electromagnetic band device that in some embodiments such as the ones illustrated in FIGS. 1-2 wraps around various automobiles such as cars, boats, and trains, and in other embodiments such as the ones illustrated in FIGS. 3-4 is used as a bumper only. The drawings show that the main components of the device are: a boat (2), a magnetic band (1), and an adhesive back side (3). In various embodiments of the present invention the boat can be substituted respectively by a train (4), or train wagons, and cars (5), such as race cars.

For the device of the present invention to be effective both approaching vehicles must be equipped with the special magnetic band of the present invention. The band is designed to apply always a positive (either North or South) magnetic field toward the outside of the vehicle and a negative field toward the inside. In this way each vehicle would have the same polarity and the force resulting by the interaction with another vehicle is of the repulsive kind.

According to classic magnetic theory the repulsive force between two identical cylindrical bar magnets is given by equation (1):

$$F = \left[\frac{B_0^2 A^2 (L^2 + R^2)}{\pi \mu_0 L^2}\right]\left[\frac{1}{x^2} + \frac{1}{(x+2L)^2} - \frac{2}{(x+L)^2}\right]$$

where $B_0$ is the magnetic flux density very close to each pole, in T; A is the area of each pole, in $m^2$, L is the length of each magnet, in m, R is the radius of each magnet, in m, and x is the distance that separates the two magnets. Being the bands installed on the outside surface of the vehicles under the teachings of the present invention, then x also represents the distance in meters between the two vehicles.

Magnetic flux can be either generated by a natural magnet or by an electromagnet. In one preferred embodiment of the present invention an electromagnet is used to generate the magnetic flux, while in a different preferred embodiment of the present invention a natural magnet is used.

Natural Magnets include magnetic rocks, but also human made alloys such as Yttrium Cobalt ($YCo_5$) Alloy, or magnetized materials such as Iron, or Rare Earth Metals, Neodymium, Neodymium alloys such as $Nd_2Fe_{14}B$ and so on. Due to the potential for oxidation of metals in one preferred embodiment of the present invention said magnet is sealed with an air tight material. Air tight sealing can be achieved wither by wrapping in a solid shell of plastic or plating it with a Noble metal such as copper or gold.

Magnetic field comes always in opposite poles. So either a natural magnet or an electromagnet generate a magnetic flux going from one to the other pole. In this way though the internal side of the magnet, the one directed toward the vehicle would generate a magnetic flux of the opposite direction, but of the same intensity of the one generated by the side of the magnet looking outward with respect to the vehicle. This flux, if left uncontrolled could potentially attract other vehicles. This the need to control this flux.

The present application discloses two way of controlling the magnetic flux generated by the side of the magnet directed to the vehicle: a first way and a second way. In said first way the band is designed to be physically surrounding the vehicle, as shown in FIGS. 1-2, so that the repulsive force, because the distance between the two repelling magnets is shorter than the distance between the repelling and the attractive magnet, is always higher in magnitude than the attractive force.

Figure 5:
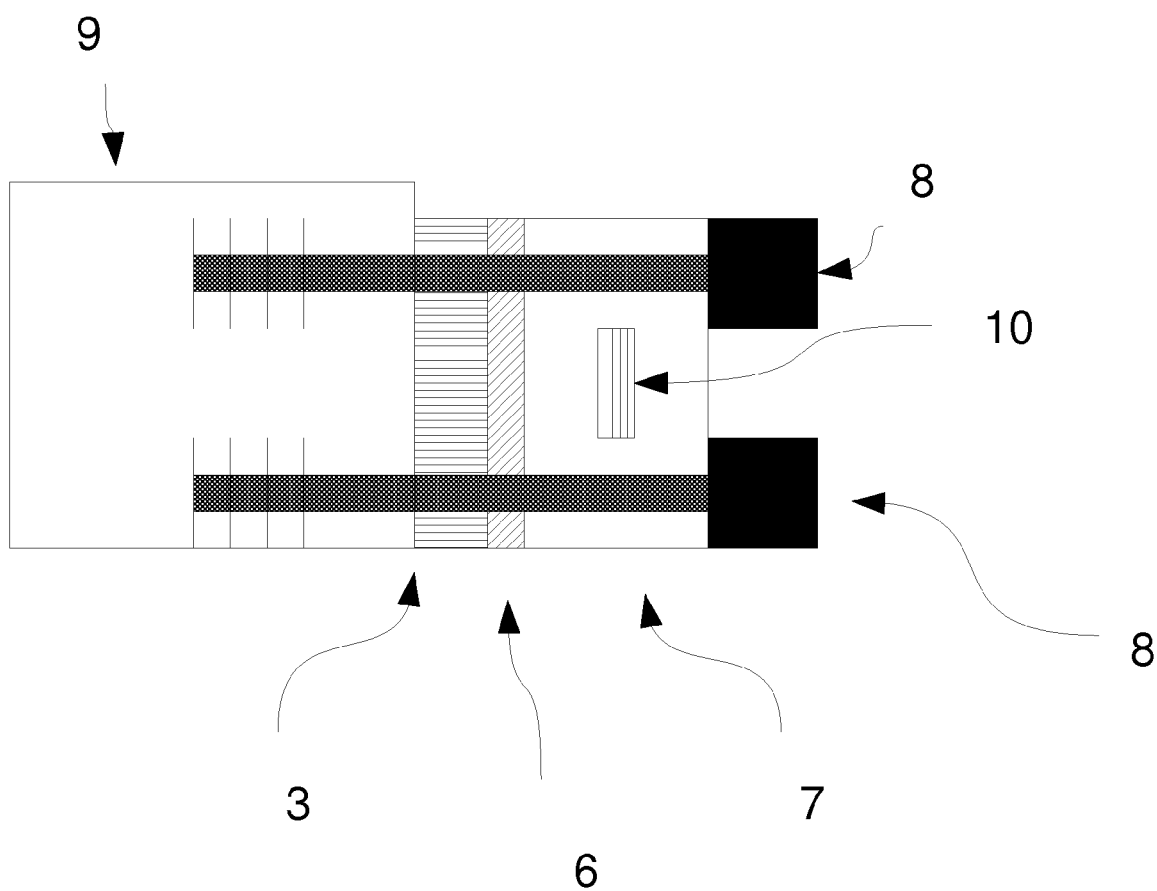
FIG. 5 is a cross sectional detail view of the Electromagnetic band of the present invention.
Figure 6:
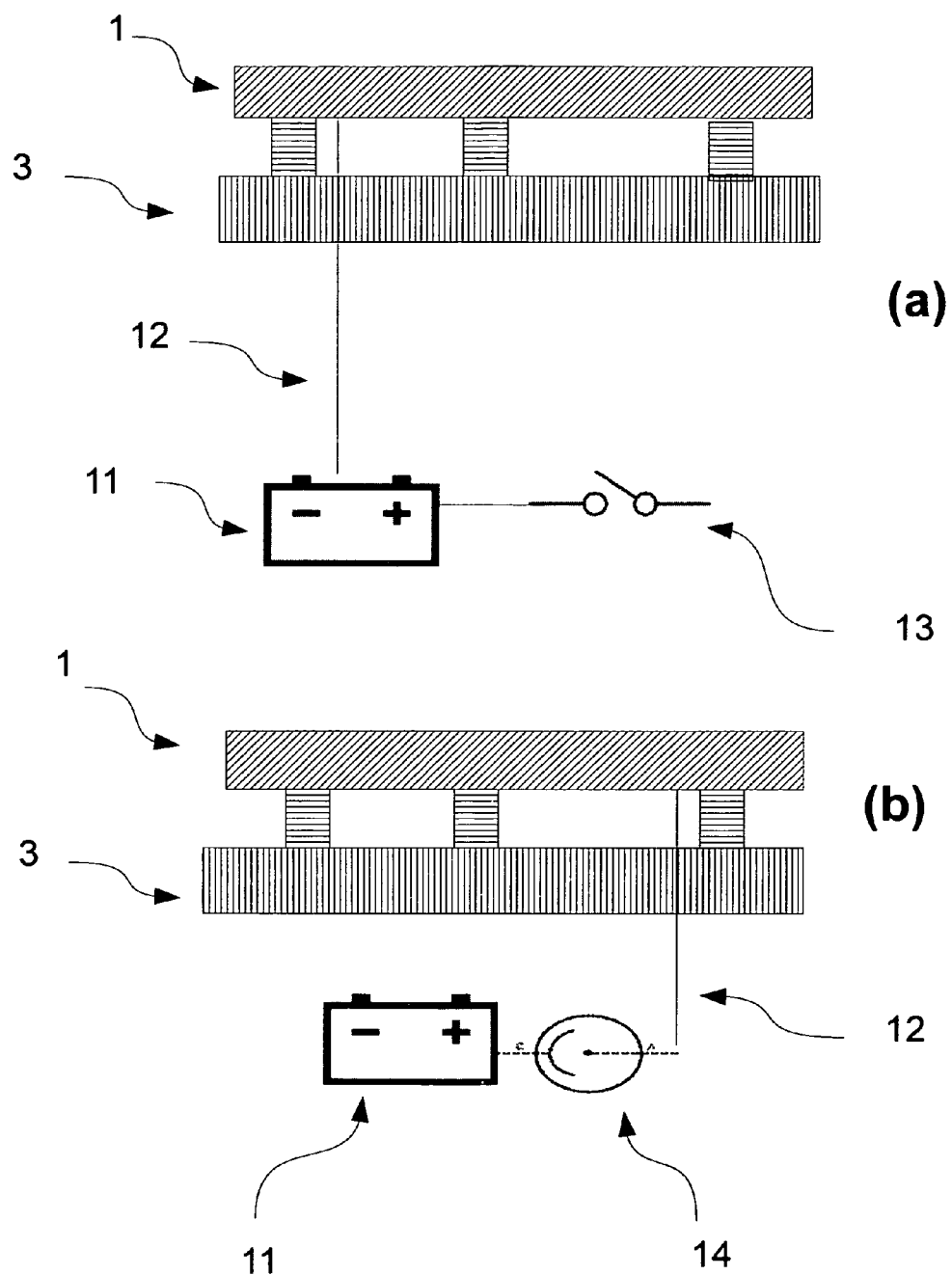
FIG. 6 is a diagrammatic view of the Electromagnetic Band of the present invention.

The second way is to use a magnetic flux shielding material (6) in between the vehicle and the inside of the magnet, as shown in FIG. 5, so that that side of the flux of the opposite sign of the repulsive one is shielded and decreased in intensity. Example of magnetic flux shielding materials include Nickel alloys, Lead films, or a mixed meshes of silver and nylon.

In the specific the present application discloses ad efficient and effective the use of a particular Nickel alloy composed by 80% Nickel, 4.5% Molybdenum, and balance Iron to be used as magnetic shield for said internal surface of the magnet.

FIG. 5 shows the detail of the structure of the magnetic band of the present invention comprising an adhesive layer (3), a magnetic shield (6), a support member (7), and a magnet (10). In a separate embodiment of the present invention the fastening action of said adhesive layer is supported by fastening means (8) such as screw, nails, bolts, washers, or the like annexed to the body of the vehicle (9). Due to the electromagnetic nature of the present invention said fastening means may be made of magnetically insulating material such as plastic, polymeric resins, fiberglass, or the like. Additionally the present invention teaches that the magnetic band is activated manually. A manual activator, (13), is also an essential element of the invention.

In the case in which the magnet (10) is an electromagnet a source of electrical power (not shown in the drawings) is electrically connected via an electrical circuitry (12) to the coils of said electromagnet. Said source of electrical power may either be the car battery (11) or a separate supplemental battery.

In the device of the present invention there is no magnet insulation but there are simple magnetic shields to protect any vehicle instrument and as it can be seen in the drawings the rings at the lowest possible place. For regular car transportation vehicles, for this system to be applied, it would need mandatory regulations as we have on the seat belts to set this protection on all cars and also the bands would be only applied at front and rear bands, because of the different designs.

As it can be seen in the car drawing the ring is attached all around the race car and the magnetic force is manually set on for the complete race, setting it off only for maintenance. About boats the magnetic force would only be set manually when a possible accident is imminent. Also the front and rear ends will need a vertical design of the magnetic band because of the up and down motion of the sea level, but on both sides it is set just above the floating line of the boat, which will make all boats and or docks bands to face each other.

Referring to regular railroad trains, there is a main possible advantage when using magnetic bands in between the front machine and the first wagon because of the possibility of separate them in an emergency, if so only the machine would face the situation, so it could be easier for the operator to stop it. City trains, Metromovers, and the like work without operator, so the system would be implemented automatically by means of photoelectric cells (14) as well as in already existing city trains but on these last ones the system could also be set manually.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnetic band comprising:
    a magnet;
    a support member to hold the magnet;
    an adhesive layer to tide said support member to the side of a vehicle and,
    an activation system.

2. The magnetic band of claim one further comprising a plurality of fastening means to provide additional support to the adhesive layer.

3. The magnetic band of claim 2 where said fastening means are bolts.

4. The magnetic band of claim 3 where said bolts are made of plastic.

5. The magnetic band of claim 1 further comprising a magnetic shield.

6. The magnetic band of claim 5 where said magnetic shield is a lead film.

7. The magnetic band of claim 5 where said magnetic shield is a Nickel Alloy.

8. The magnetic band of claim 7 where said Nickel Alloy is composed by 80% Nickel, 4.5% Molybdenum, and balance Iron.

9. The magnetic band of claim 1 where said magnet is a natural magnet.

10. The magnetic band of claim 9 where said natural magnet is a magnetic rock.

11. The magnetic band of claim 9 where said natural magnet is a Yttrium Cobalt alloy.

12. The magnetic band of claim 11 where said Yttrium Cobalt alloy has the Yttrium Cobalt ratio equal to 1 Yttrium Atom per 5 Cobalt Atoms.

13. The magnetic band of claim 9 where said natural magnet is sealed in a shell of plastic.

14. The magnetic band of claim 9 where said natural magnet is electroplated with a layer of a noble metal.

15. The magnetic band of claim 14 where said noble metal is gold.

16. The magnetic band of claim 1 where said magnet is an electromagnet.

17. The magnetic band of claim 16 further comprising:
    an electrical circuitry, electrically connecting said electromagnet to a power source, and;
    a power source.

18. The magnetic band of claim 17 where said power source is a main car battery.

19. The magnetic band of claim 1 where said activation system is manual.

20. The magnetic band of claim 1 where said activation system is triggered by a photoelectric cell.

* * * * *